May 21, 1963

W. M. MUTH, JR., ETAL 3,090,508

CONVEYOR

Filed Sept. 23, 1960

INVENTORS
WILLIAM M. MUTH Jr.
JAMES H. HOLLYDAY

ATTORNEY

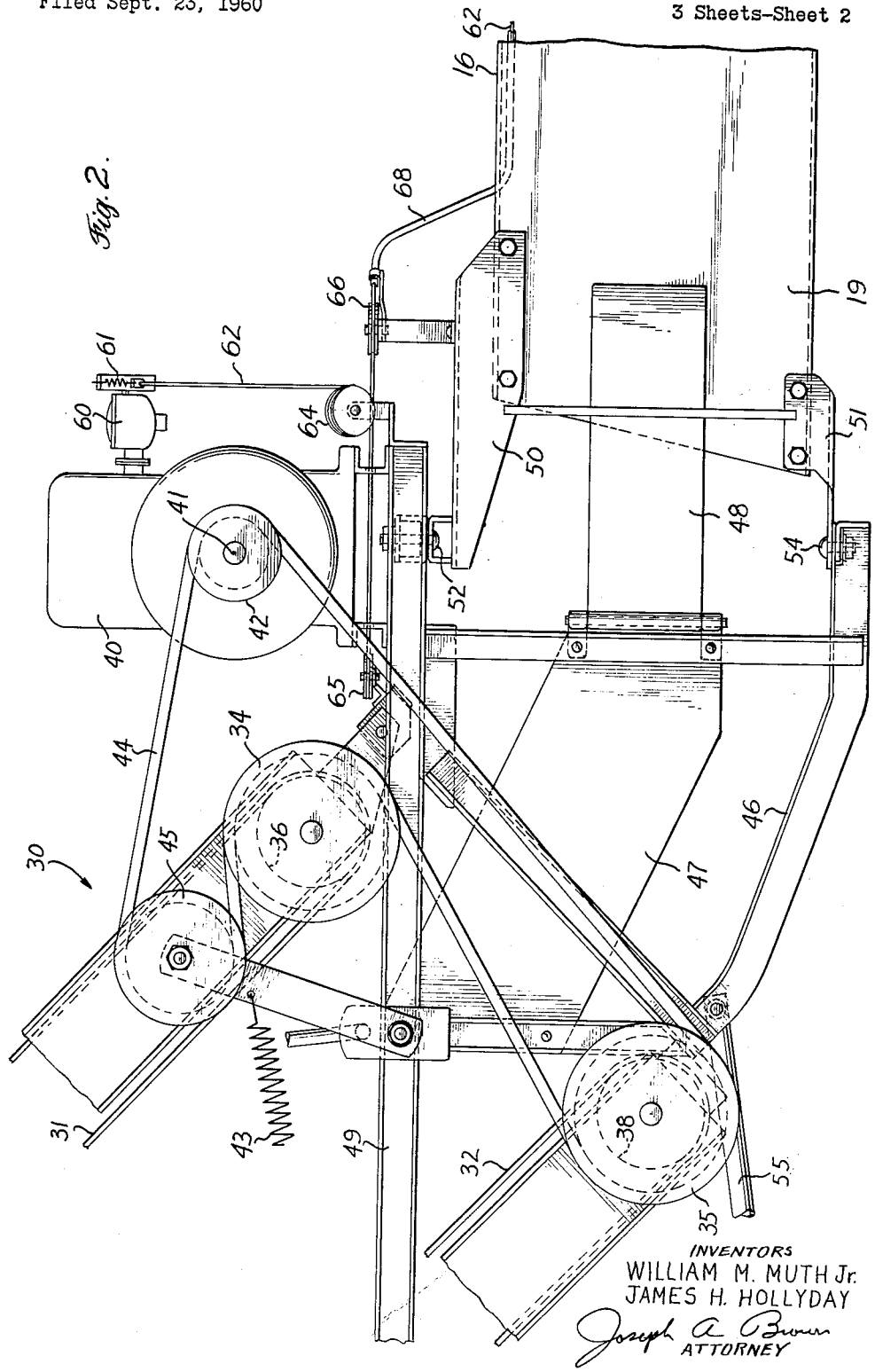

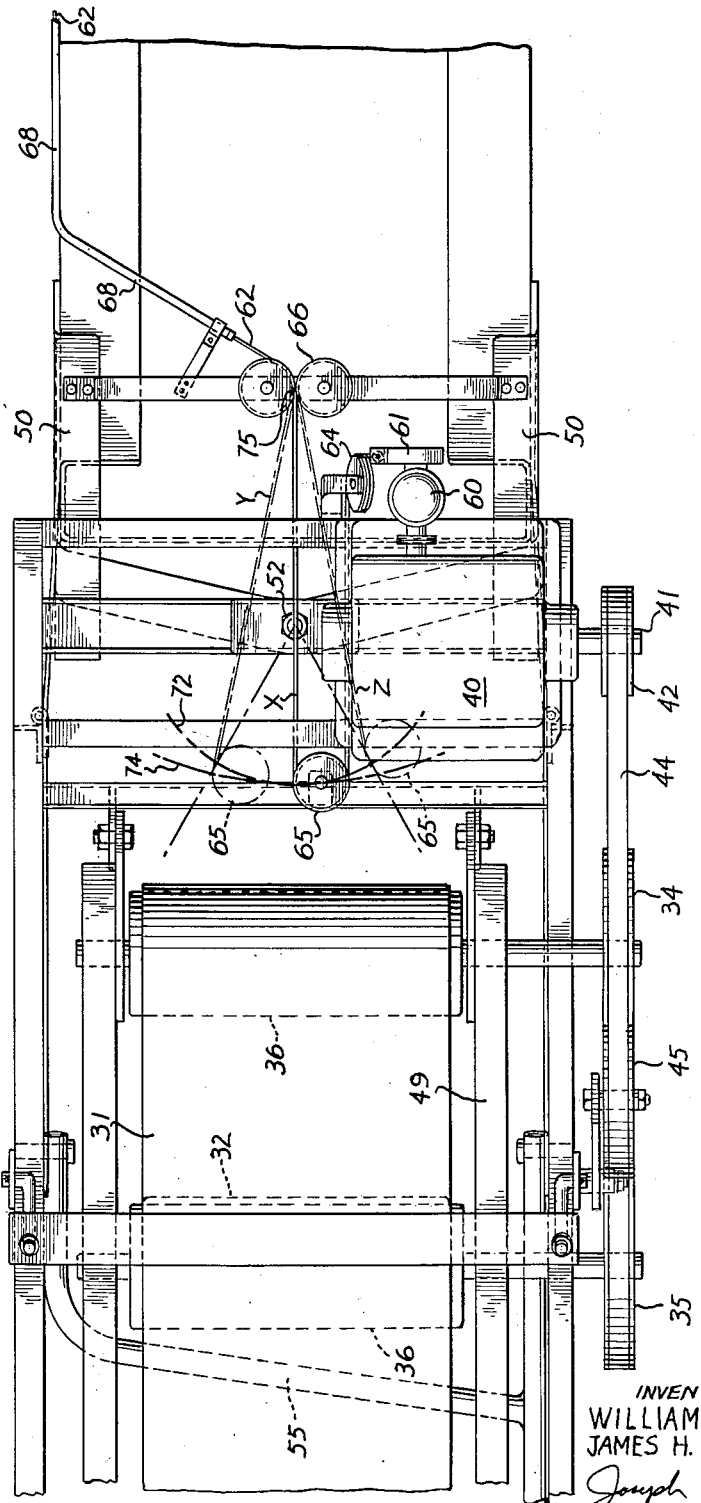

United States Patent Office 3,090,508
Patented May 21, 1963

3,090,508
CONVEYOR
William M. Muth, Jr., Akron, and James H. Hollyday, New Holland, Pa., assignors to Sperry Rand Corporation, New Holland, Pa., a corporation of Delaware
Filed Sept. 23, 1960, Ser. No. 57,976
7 Claims. (Cl. 214—42)

This invention relates to a device connected to the discharge end of a hay baler and operable to throw each emerging bale into a trailing wagon. More particularly, the invention relates to means for automatically controlling the distance each bale will be thrown by the device.

Heretofore, a bale thrower has been provided comprising a pair of endless conveyors mounted one above the other at the discharge end of a baler. The conveyors comprise endless belts having opposed reaches which cooperate with each other to engage and project a bale from the baler to the wagon. The endless conveyors operate continuously. They have friction surfaces which engage each emerging bale. There is relative movement between the endless conveyors and a given bale to be thrown until such time as the conveyor members have a sufficient grasp on the bale to throw it. The endless conveyors are driven by a small variable speed engine mounted on the baler.

When the baler is in operation in the field, the tractor operator follows the windrows to be picked up and baled. Such windrows may be curved and extend in various directions. Therefore, there are continual directional changes in the travel of the baler. When the baler changes course, the longitudinal axis of the fore-and-aft extending bale chamber shifts relative to the longitudinal axis of the wagon. To compensate for such a change, the bale thrower is pivotally mounted for lateral swinging movement at the rear end of the baler. A suitable connection is provided between the thrower and the tongue of the wagon whereby the thrower will be directed toward the wagon regardless of the angular position of the baler relative to the wagon.

Further, the engine which operates the thrower is provided with throttle means whereby the distance each bale is trajected can be controlled. Usually, the operator fills the rear end of the wagon first and gradually has the bales land toward the forward end of the wagon until a full load is achieved. Although such thrower is pivotally mounted for laterally swinging movement, such swinging is limited so that each bale will not be unduly restricted as it emerges. A bale can be readily deflected as it emerges up to about thirty degrees relative to the longitudinal axis of the bale case without producing undue binding. However, if the bale is deflected sixty degrees from its path of travel as it emerged from a bale case, undue binding will result. Therefore, the lateral movement of the thrower to point toward the wagon is limited in the range of about thirty degrees to one side or the other of a normal operating position. When a sharp turn is made, the baler bale case may swing sixty or more degrees relative to the wagon. If the bale thrower is swung by such turn to its maximum lateral position of about thirty degrees, there remains an additional thirty degrees which has not been compensated for. If the thrower then tosses a bale on a full throwing stroke, the bale so thrown may pass over one of the wagon sides and land on the ground. However, if the speed of operation of the thrower is reduced to a minimum at such movement, that is when a sharp turn is being made, the bale will travel in a relatively low, short trajectory, insuring that the bale will be deposited in the wagon.

One object of this invention is to provide, with a bale thrower of the character described, automatic means to regulate the distance of trajectory of a thrown bale, such control being responsive to turning of the baler relative to the wagon.

Another object of this invention is to provide means whereby an automatic bale thrower will deposit or throw a bale into a trailing wagon regardless of the relative position of the baler and the wagon.

Another object of this invention is to provide automatic control means, for a bale thrower of the character described, whereby when the wagon is trailing directly behind the baler, the bales will be thrown toward the rear end of the wagon, and when a turn is being made the bales will be thrown toward the front portion of the wagon.

Another object of this invention is to provide control means of the character described having manual means incorporated therein whereby the maximum distance bales will be thrown by the device may be established by the operator of the baler.

A still further object of this invention is to provide bale thrower control means of the character described which is simple, inexpensive and easily installed and repaired.

Other objects of this invention will be apparent hereinafter from the specification and from the recital in the appended claims.

In the drawings:

FIG. 2 is an enlarged fragmentary view of the bale thrower and the control means therefore; and FIG. 3 is a plan view of FIG. 2.

Figure 1:
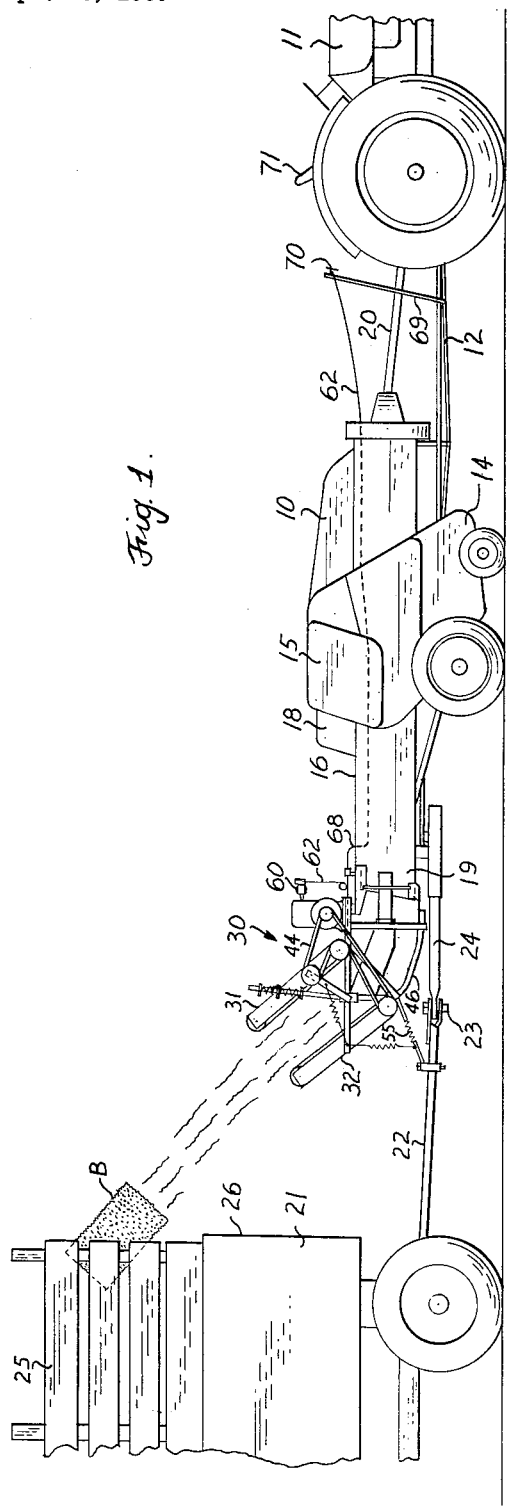
FIG. 1 is a fragmentary side elevation showing a tractor, a baler, a bale thrower mounted on the baler, and a wagon towed behind the baler, the thrower being provided with automatic control means constructed according to this invention.

Referring now to the drawings by numerals of reference, and first to FIG. 1, 10 denotes a hay baler connected to a tractor 11 by a tongue 12 whereby the baler is towed by the tractor. The baler has a pickup 14 which elevates the crop material to be baled and delivers it to a feeding mechanism contained in housing 15. Such feed mechanism may be similar to that shown in U.S. Patent No. 2,950,670. The hay is delivered to a bale forming chamber 16 and compressed into bales. When each bale is completed, it is banded and tied by a suitable tying mechanism, not shown, contained in housing 18. The bales formed by the baler are successively discharged through a rear end 19 of bale case 16. The pickup, infeed and bale forming means of the baler are all driven from a power take off connection 20 to the tractor 11.

Trailing behind baler 10 is a wagon 21 having a tongue 22 pivotally connected at 23 to a drawbar 24 extending rearwardly from beneath the rear end of the baler. Wagon 21 has side walls 25 and a front wall 26. The front wall 26 is considerably lower than the side walls, as shown.

As each bale is discharged from the bale case 16, it is thrown from the baler and into the wagon 21 by a thrower mechanism 30. A trajected bale B travels over the front wall 26 and between the side walls 25. The distance of the trajectory is such that the bale lands in the wagon. The thrower comprises a pair of cooperative endless belts, namely, an upper belt 31 and a lower belt 32 which are inclined upwardly and rearwardly, as shown, relative to the rear end 19 of the bale case. The belts are spaced apart a distance substantially the same as the thickness of the bales discharged from the baler.

When viewed as shown in FIG. 1, the upper endless belt 31 rotates in a clockwise direction, while the lower belt 32 rotates in a counterclockwise direction. The upper endless belt 31 is driven by a pulley 34 (FIG. 2) and the lower endless belt 32 is driven by a pulley 35. These pulleys drive rollers 36 and 38, respectively, over which the respective belts are trained. The belts are driven by an engine 40 having an output drive shaft 41 on which a pulley 42 is mounted. An endless drive belt 44 extends around pulley 42 and around the pulleys 34 and 35 to drive them. A tightener wheel 45 biased by a spring 43 is provided to keep belt 44 tight.

Each bale is guided to the endless throwing members 31 and 32 by a bottom guide plate 46 and lateral guide plates 47, having forwardly extending sections 48 which are slidable in a fore-and-aft direction relative to bale case 16. It will be apparent that the top side of each emerging bale is engaged by the belt 31 while the bottom of the bale is engaged by the belt 32. The belts 31 and 32 may be made of rubber or some other suitable material having a friction surface suitable for engaging the bale to impart a throwing velocity thereto.

Bale thrower 30 includes a framework 49 mounted on the rear end 19 of bale case 16 by brackets 50 and 51 suitably bolted to the bale case. The supporting structure includes vertically aligned pivot pins 52 and 54 which provide a vertical axis about which the thrower is laterally swingable. When the baler changes its direction of travel, drawbar 24 and tongue 22 pivot relative to each other about the hitch pin 23. Such pivoting is transmitted to the thrower by a link arm 55 which causes the thrower to swing laterally responsive to changes in direction of the baler 16 relative to the wagon 21. If the baler turns to the left, the thrower is pivoted toward the left so that the thrower will continue to be directed toward the wagon during the normal operation of the equipment. If the baler turns toward the right, the thrower pivots or swings toward the right to thereby continue to point toward the wagon. Such direction control is highly important to the efficient operation of the throwing mechanism and insures that bales will land in the wagon and not be thrown on the ground if throwing occurs while a turn is being made.

When the turns made by the baler are relatively small, such as thirty degrees or less, as will occur when the baler operator is following the windrow to be baled, the thrower will always be properly oriented relative to the wagon. However, if operator of the tractor 11 makes a very sharp turn and the baler swings to a position where the longitudinal axis of the bale case 16 is substantially swung over relative to the longitudinal axis of the wagon, for example sixty degrees or more, then the bale thrower will not be fully directed toward the wagon because of the limited swinging of the thrower. Such a limit results primary from the link connection 55 between the thrower and the tongue 22 which will cause and allow the thrower to swing laterally only a certain amount. If the baler is sharply disposed relative to the wagon when a bale is thrown, there is a chance that the bale will pass over the side wall 25 and land on the ground if thrown at full force. This invention purposes that when a bale is thrown during the making of a sharp turn, the bale will be trajected only a short distance whereby it will be unable to clear the wagon sides and will land in the forward portion of the wagon 21. Such is achieved automatically by the structure which will now be described.

The engine 40 has a throttle 60 biased toward closed position by a spring 61. The throttle is held in an open position by a cable 62 which extends around the guide roller 64, then rearwardly and around a control member or guide roller 65, and then forwardly and between a pair of guide rollers 66. From there, cable 62 extends through a guide tube 68 toward the forward end of the baler, see FIG. 1. The tongue 12 of the baler has a control stand 69 which at its upper end carries a handle 70 connected to cable 62 whereby the cable can be pushed or pulled by the operator. Also as shown in FIG. 1 the handle 70 is adjacent the seat 71 on the tractor 11 whereby the handle can be readily reached by the tractor operator. The handle 70 is used to establish the maximum open position of the throttle 60 when the thrower is in operation. From such maximum position, the throttle is adapted to be closed responsive to pivoting of the thrower by link arm 55. This is as shown best in FIG. 3.

As illustrated, the guide rollers 66 are forwardly of the vertical axis provided by pins 52 and 54 while the control member or guide roller 65 is rearwardly of such axis. When the thrower swings laterally, it swings about the vertical axis provided, that is, about the arc indicated by the dotted line 72. However, the cable 62 swings about an arc 74 having a pivot point 75 between rollers 66. The point 75 to member 65 is a distance X when the thrower is in its normal neutral position. If the thrower swings in a clockwise direction from the position shown in FIG. 3, the distance from 75 to 65 is decreased to the distance Y. If the thrower swings in a counter-clockwise direction, the distance from the point 75 to the control member 65 is decreased to the distance Z. The distances Y and Z are less than the distance X, and control member or guide roller 65 is closer to throttle 60. Therefore, when the thrower swings to either side of its neutral position, the cable 62 is progressively slackened, whereby the spring 61 is able to become effective and move the throttle toward closed position.

It will thus be seen, that when the thrower swings right or left from its neutral position, the distance the bale B will be thrown progressively decreases. When the thrower is swung to either extreme from its normal position, the throttle will move toward its greatest closed position. The speed of the engine 40 is then cut to a point where a thrown bale will land in the forward portion of wagon 21. When the throttle of the motor 40 has been moved toward closed position, it is opened again when the thrower swings back towards normal position because such movement will pull cable 62 against the resistance of spring 61. It will be apparent, however, that by pushing or pulling on the handle 70, the operator through the medium of the cable 62 can also manually control the engine throttle. Thus, the distance a bale will be thrown is automatically controlled. Nevertheless, the operator is provided with manual means whereby he can open or close the throttle or provide a maximum speed at which the engine will operate regardless of the position of the throwing mechanism.

The above structure insures that thrown bales will be deposited in the wagon 21 and bales will not land on the ground when a turn is being made. The normal swinging of the thrower insures that the thrower will always toss a bale toward the wagon. However, when a very sharp turn is made, the speed of the thrower will be cut back to thereby provide a short trajectory to increase the probability of the bale landing in the forward end of the wagon. Such structure renders the operator's task very simple, providing a continuous control without the aid of the operator. All that is left in the hands of the operator is to set the maximum trajectory of the thrower.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Bale trajecting means, means mounting said trajecting means on a baler for lateral swinging movement to either side of a neutral position, an engine driving said trajecting means, a throttle for regulating the speed of said engine, means biasing said throttle toward closed position, a control member mounted on said trajecting means for swinging movement therewith, and a control cable extending from said control member to said throttle and holding the throttle against said biasing means in an opened position when the trajecting means is in said neutral position, the distance between said control member and said throttle progressively decreasing upon swinging of said trajecting means on either side of said neutral position thereby releasing the throttle to progressively lower the speed of said engine and reduce the distance bales will be trajected by the trajecting means.

2. Bale trajecting means, means mounting said trajecting means on a baler for lateral swinging movement to either side of a neutral position, an engine driving said trajecting means, a throttle for regulating the speed of said engine, means biasing said throttle toward closed position, a control member mounted on said trajecting means for swinging movement therewith, and a control cable extending from said control member to said throttle and holding the throttle against said biasing means in an opened position when the trajecting means is in said neutral position, the distance between said control member and said throttle progressively decreasing upon swinging of said trajecting means on either side of said neutral position thereby releasing the throttle to progressively lower the speed of said engine and reduce the distance bales will be trajected by the trajecting means, and manually operable means for pulling and releasing said cable whereby said throttle may be manually as well as automatically regulated.

3. Bale trajecting means, means mounting said trajecting means on the discharge rear end of a hay baler for pivotal, swinging movement about a vertical axis and to either side of a neutral position, an engine driving said trajecting means, a throttle for regulating the speed of said engine, spring means biasing said throttle toward closed position, a control member mounted on said trajecting means rearwardly of said vertical axis and at a given distance from said throttle when said trajecting means is in said neutral position, and a control cable extending from a given point forwardly of said vertical axis to said control member and then to said throttle, the distance from said control member to said throttle progressively decreasing on swinging movement of said trajecting means on either side of said neutral position thereby releasing the throttle to progressively lower the speed of said engine and thus the distance bales will be trajected by the trajecting means.

4. In combination, a hay baler movable over the ground and from which bales emerge, a wagon towed by said baler, trajecting means receiving each emerging bale and throwing it into said wagon, means mounting said trajecting means on said baler for swinging movement relative thereto, directional control means interconnecting said trajecting means and said wagon to swing the trajecting means responsive to relative movement between said baler and said wagon whereby each bale will be trajected toward the wagon regardless of the position of the baler relative to the wagon, variable speed power means operating said trajecting means, and control means automatically regulating the operating speed of said power means in response to the position of the baler relative to the wagon to thereby vary the distance a bale is trajected from the baler.

5. A combination as recited in claim 4 wherein said trajecting means normally extends in a neutral position and is swingable laterally to either side of said neutral position, said power means being regulated regardless of which side of said neutral position said trajecting means swings.

6. A combination as recited in claim 4 wherein said variable speed power means comprises an engine having a throttle biased toward closed position, and said control means comprises a cable connected between said trajecting means and said throttle.

7. In combination, a hay baler movable over the ground in a forward direction and from which bales emerge rearwardly, a wagon towed behind said baler, trajecting means receiving each emerging bale and throwing it into said wagon, means mounting said trajecting means on said baler for angular swinging movement relative thereto, direction control means connected to said trajecting means to swing the trajecting means relative to the baler and thereby vary the direction in which bales are trajected whereby bales may be deposited in said wagon regardless of the position of the baler relative to the wagon, variable speed power means operating said trajecting means, and control means interconnected between said power means and the trajecting means to automatically regulate the operating speed of the power means in response to the position of the trajecting means relative to the baler to thereby vary the distance a bale is trajected from the baler.

References Cited in the file of this patent
UNITED STATES PATENTS

| | | |
|---|---|---|
| 1,436,508 | Lane et al. | Nov. 21, 1922 |
| 2,533,814 | Karlsson | Dec. 12, 1950 |
| 2,789,705 | Eberly | Apr. 23, 1957 |
| 2,834,484 | De Vaney et al. | May 13, 1958 |